Patented Nov. 10, 1953

2,658,824

UNITED STATES PATENT OFFICE 2,658,824

SOIL CONDITIONING AGENTS OF DESERT PLANT ORIGIN AND THEIR USE

Ralph W. Dickenson, Anaheim, Calif.

No Drawing. Application November 14, 1949, Serial No. 127,276

9 Claims. (Cl. 71—1)

This invention has to do generally with the production of soil treating agents and with the conditioning of depleted agricultural soils with the object of restoring their productivity by virtue of both physical and chemical influences in the soil.

The more general practices in attempting to improve the fertility and productivity of agricultural soils, typically citrus orchard soils, have been predicated upon restoration in the soil of various inorganic elements to meet a real or supposed chemical deficiency. It has been realized that the productivity of many soils has been impaired not only by chemical depletion, but by the development of an over dense or compact condition of the soil, frequently accompanied by excess alkalinity. Accordingly various additives, typically acidic, have been introduced to the soil for the purpose of producing a flocculating and density reducing effect, essentially physical in end result.

The present invention is mainly predicated upon the observation that proper condition of a soil is largely dependent upon the existence and maintenance therein of organic components, and living organisms such as the naturally proper molds, bacteria and the like. Accordingly, my primary objects are directed to the production and use of a soil treating agent having the effect upon introduction to the soil, of promoting the growth of such organisms, with resultant fertilization of the soil by virtue of its becoming deflocculated or loosened, and by the plant nutrition values contained in or cultivated by the treating agent. Of further importance is the capacity of the treating agent to render the plant food values initially or normally in the soil, capable of assimilation to better advantage by the plants.

As a result of extensive experimentation and observation, I have found that the fermenting extracts of various desert plants are highly effective as soil conditioning agents. At the outset, I wish to distinguish between such extracts (e. g. obtained by water leaching of cactus plants) which have not been fermented or in which fermentation has been arrested, or which can ferment only with putrefaction, and the present materials which are actively fermented, and packaged, distributed and applied to the soil in fermenting condition which indefinitely leaves the product "sweet" in the sense that it does not degrade by a putrefying fermentation. My experiences show that by introduction to the soil of the actively fermenting extract, it is possible to condition the soil to better advantage with respect to both time and resultant productivity of the soil, than with any similar non-fermenting extract. Although all the reasons for the beneficial action and effect of the fermenting agent cannot be known, it appears that its predominating properties are that of lending acidity to the soil, and of promoting the development therein of those molds and bacteria essential to fertility.

The desert plant sources of the present material are in the broad contemplation of the invention, any or all of the following: The Liliaceae or desert plant lily family, specifically the yuccas and preferably the Mohave yucca or Spanish dagger; the Zygophyllaceae or caltrop family and specifically the creosote bush (covillea) or greasewood; and the Cactaceae or cactus family, of which the prickly pear species, and specifically pancake cactus, is preferred.

Generally speaking, any suitable method may be used to water leach or extract water soluble constituents of the plants to produce a fermenting solution. A preferred procedure, applicable to the preparation of a fermenting extract solution from any one of the aforementioned plants, or combinations thereof, is to physically reduce the plant to a more or less finely divided condition and then to leach out the water soluble constituents to produce a solution which undergoes fermentation.

In preparation of the greasewood extract, the branches of the greasewood plant are put through a hammer mill, usually when the plant is in green condition, although the greasewood plant may be used at various different degrees of dryness. The hammer mill may be of the conventional type which reduces the plant to a short fibrous pulp passing for example a ½ to ¾ inch mesh screen. The characteristics of the greasewood plant are such that no appreciable or apparent juice is freed in the operation of converting the plant to a pulp.

In preparing the yucca or Spanish dagger, I preferably use the dry or dead plant for several reasons, among which are better surface contact between the disintegrated dry plant and water because of the tendency of the dry plant to break up into finely threaded or fibrous condition. Also the dry plant fibers cause less sudsing of the solution during the water leaching stage. As in the case of the greasewood, the yucca may be disintegrated in a hammer mill to convert the plant into a fibrous pulp passing through a ½ to ¾ inch mesh screen. As will be understood, the yucca and greasewood may be ground separately or together, and their water soluble constituents leached out in separate water solutions or together in the same water solution.

As illustrative, about 100 pounds of the individual pulps may be contacted each with around 150 gallons of water, as by placing a porous sack containing the pulp in a body of the water. Where the two pulps are to be leached simultaneously, a 100 pound mixture thereof may be leached in around 150 gallons of water. The solution is allowed to stand and digest, preferably while the pulp remains in the water, over a period of time sufficient for fermentation to start and progress to an active state, as evidenced by the evolution of gas bubbles out of the solution. The leaching operation may occur at ordinary atmospheric temperatures and over a period of five to seven days, or longer, at the end of which time the solution will have attained a state of active fermentation. It is contemplated that fermentation may be accelerated, e. g., during colder atmospheric conditions, as by mild heating of the solution; also that the digestion of the pulp may be allowed to progress for a considerable period of time after the starting of active fermentation. Ordinarily it may be preferred to continue the digestion until gas evolution from the solution has substantially ceased.

A fermenting solution of the cactus or prickly pear extract may similarly be prepared by passing the "pears" through an ordinary food chopper which reduces the plant to say ¼ to ½ inch pieces or slices. The resulting pulp then may be sacked and leached in water at a pulp to liquid ratio of say around 50 pounds of pulp to 150 or more gallons of water. The water to cactus pulp ratio may be such that the resulting extract solution assumes a viscous and stringy consistency. As with the other extracts, the cactus extract is allowed to stand till active fermentation has started and continued over a period of time. It is contemplated that wherever desirable, the three plant pulps may be leached in the same water solution and with resulting extracts fermented together.

Excellent results have been obtained using a final product composed of substantially equal parts of the fermenting extracts of the three pulps. As previously indicated, the soil appears to be beneficially affected by the use of any of the individual fermenting extracts, or any combinations thereof, although in order to obtain the most outstanding results, it is preferred that the product contain the fermenting extracts of all three pulps. The primary advantages of the yucca and greasewood ferments, appear to be those of adding acidity to the soil, with resultant corresponding neutralization of the soil and increased flocculation and water penetrability, together with the effect of the ferment in promoting the proper mold and bacteria development in the soil. Better soil deflocculation appears to result from the use of both the yucca and greasewood extract ferments, as compared with the use of either individually. The cactus extract ferment appears to be particularly effective in promoting development of the desired organisms in the soil, and in the presence of the yucca and greasewood ferments, its action in the soil becomes particularly pronounced by reason of the uniform distribution and dispersion therein made possible by reason of the penetrating and flocculating qualities of the yucca and greasewood ferments.

As will be understood from the foregoing, the product is packaged, ordinarily in barrels, in a state of active fermentation, though not necessarily with any appreciable gas evolution, in which condition the product remains during distribution and at the time of its introduction to the soil. The material may be applied to the soil in any suitable manner, as by introducing it in relatively small quantities to irrigating water, or by applying the fermenting product to the surface of the soil for penetration by surface-applied water.

It is found desirable in the preparation of successive batches of fermenting extract or extracts, to reuse at least a portion of the pulp present in and during the leaching and fermentation of a previous batch. Accordingly, for preparation of a subsequent fermented batch, fresh pulp may be added to a portion, say from 25% to 75%, of the residual pulp from a preceding batch. Reuse of some of the pulp may be advantageous by reason of its content of residual water soluble constituents, and its tendency to accelerate and activate fermentation.

In referring to the present material as a fermenting product, the term "fermentation" is intended to define a condition of microorganism (mold, bacterial or enzymatic) activity existing within the material in life cycles, and continuing from the time of its initial extraction and digestion, according to which new organisms are progressively being created and cultivated as others expire. During the extraction stage, fermentation is evidenced by the evolution of gas from the water solution of the dissolved plant solubles. Subsequently, as when the product has digested to the condition in which it is barreled or otherwise packaged for distribution, gas generation within the material may have substantially ceased, but the fermentation processes nevertheless continue, as indicated by the development of visible growth or residues. To illustrate, a substantially clear quantity of the material separated from solid residue following the initial gas-evolving fermentation stage, in the course of time will develop a growth or residue in the nature of a "mother," thus establishing the continuity of the fermentation process and microorganic life cycle in the material. It is important to again observe, as previously indicated, that the fermentation is not of a kind resulting in putrefaction of the material as would otherwise result from an extraction procedure initially resulting in the killing of the mold, bacterial and enzymatic life in the extract. By the present method of low temperature extraction, the microorganic life cycles are permitted to continue in the material from the time of its extraction from the plant, until and following its introduction to the soil.

Apparently it is by virtue of the continuing bacterial and enzymatic life sustaining qualities of the material, that its commercial applications have produced outstanding results in soil conditioning and the promotion of plant growth. Specifically the direct effects of the material appear to be those resulting from a bacterial feeding of the soil with consequent stimulation and increase of bacterial activity in the soil to the extent of materially improving both the physical condition of the soil as related to plant growth, and the assimilatability by the plants of the food values in the soil.

This application is a continuation-in-part of my copending application Serial Number 58,806, filed November 6, 1948, on Soil Conditioning Agents of Desert Plant Origin and Their Use, which is now abandoned.

I claim:

1. The method of preparing an agricultural soil conditioning agent, that includes water-leaching disintegrated yucca plants, greasewood plants and prickly pears, continuing the water-leaching and digestion of the water and plant mixture over an extended period of time and at substantially atmospheric temperature, and forming a single non-putrifying water solution containing the bulk of the water soluble juice content of all said plants and pears.

2. The method of preparing an agricultural soil conditioning agent, that includes water-leaching disintegrated yucca plants, greasewood plants and prickly pears by maintaining and digesting the plants and pears in water at substantially atmospheric pressure and over a period in excess of five days, and forming a single non-putrifying water solution containing the bulk of the water soluble juice content of all said plants and pears.

3. The method of preparing an agricultural soil conditioning agent, that includes water-leaching disintegrated yucca plants and greasewood plants, separately water-leaching prickly pears, maintaining and continuing said leachings and digestion of the water and plant mixtures at atmospheric temperature and over a period in excess of five days, and forming a single non-putrifying water solution of the water soluble juices of said plants and pears.

4. A soil conditioning agent comprising a non-putrifying water solution of the water soluble juices of yucca plants, greasewood plants and prickly pears prepared by water-leaching and digesting said plants and pears in the leaching water over an extended period of time in excess of five days at substantially atmospheric temperature.

5. The method of conditioning agricultural soil, that includes introducing to the soil a non-putrifying water solution of the water soluble juices of yucca plants, greasewood plants and prickly pears prepared by water-leaching said plants and pears and digesting them in the leaching water over an extended period of time in excess of five days at substantially atmospheric temperature in a concentration and amount sufficient to improve the agricultural properties of said soil.

6. The method of treating arable soil which comprises applying thereto and in a concentration and amount sufficient to improve the agricultural properties of the soil, a dilute aqueous solution containing water-soluble constituents extracted from greasewood plants by water leaching the plants in disintegrated form at substantially atmospheric temperature, continuing the water leaching and digestion of the water and plant mixture over an extended period of time at atmospheric temperature and forming a single non-putrifying water solution containing the bulk of the water-soluble juice content of said plants.

7. The method of treating arable soil which comprises applying thereto and in a concentration and amount sufficient to improve the agricultural properties of the soil, a dilute aqueous solution containing water-soluble constituents extracted from greasewood plants and prickly pear plants by water leaching the plants in disintegrated form at substantially atmospheric temperature, continuing the water leaching and digestion of the water and plant mixture over an extended period of time at atmospheric temperature and forming a single non-putrifying water solution containing the bulk of the water-soluble juice content of said plants.

8. The method of treating arable soil which comprises applying thereto a dilute aqueous solution containing the water-soluble constituents extracted from greasewood plants in a concentration and amount sufficient to improve the agricultural properties of said soil, said extraction being effected by water leaching of the plants at about atmospheric temperature and digestion in the leaching water over a period in excess of five days.

9. The method of treating arable soil which comprises applying thereto a dilute aqueous solution containing the water-soluble constituents extracted from greasewood plants and from prickly pear plants in a concentration and amount sufficient to improve the agricultural properties of said soil, said extraction being effected by water leaching of the plants at about atmospheric temperature and digestion in the leaching water over a period in excess of five days.

RALPH W. DICKENSON.

References Cited in the file of this patent

UNITED STATES PATENTS

| Number | Name | Date |
| --- | --- | --- |
| 2,320,060 | Barlow et al. | May 25, 1943 |

OTHER REFERENCES

Agricultural J. India, vol. 25 (1930), page 368.